Feb. 6, 1923. 1,444,665
C. F. CROMMETT
GASEOUS FUEL COMPOSITION AND METHOD OF MAKING THE SAME
Filed July 26, 1920
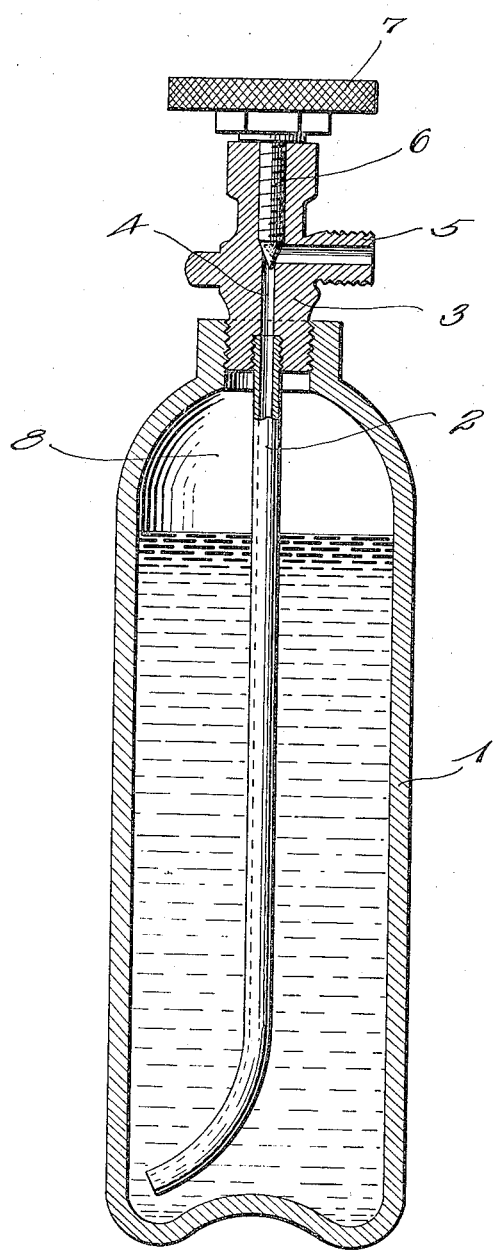
Witness
Inventor
C. F. Crommett
Attorneys Patented Feb. 6, 1923.

1,444,665

UNITED STATES PATENT OFFICE.

CHARLES F. CROMMETT, OF ELIZABETH, WEST VIRGINIA, ASSIGNOR TO GODFREY L. CABOT, OF BOSTON, MASSACHUSETTS.

GASEOUS-FUEL COMPOSITION AND METHOD OF MAKING THE SAME.

Application filed July 26, 1920. Serial No. 398,921.

*To all whom it may concern:*

Be it known that I, CHARLES F. CROMMETT, a citizen of the United States, residing at Elizabeth, in the county of Wirt and State of West Virginia, have invented certain new and useful Improvements in Gaseous-Fuel Compositions and Methods of Making the Same; and I do declare the following to be a full, clear, and exact description of the invention, such as will enable others skilled in the art to which it appertains to make and use the same.

The present invention relates to a fuel suitable for use in blow pipes for cutting and welding metals and for other operations and to a method of preparing such material. It is to be understood that the fuel will be used in a gaseous state but will be dispensed in a liquefied condition.

Acetylene and similar gases have been used in a blow-pipe work for cutting and welding metals, even metals which have high melting points such as cast iron, wrought iron and steel. Natural gas has been employed in the form of a blow-pipe flame but heretofore it has not been possible to use natural gas for cutting and welding steel, for the reason that a sufficient amount of heat cannot readily be secured, to enable the cutting or welding operations to be successfully carried out. Natural gas has heretofore been compressed under high pressure and cooled, for the purpose of liquefying either the whole or a substantial part of the gas. The liquid thereby produced, when allowed to evaporate, produces a gas which likewise cannot successfully be used for welding operations. It is the object of the present invention to produce a fuel having a higher calorific power and capable of producing a much greater degree of heat when burned in a blow-pipe flame, from such liquefied natural gas, or other gas of like composition. It is to be understood that while, in the following description, I refer to natural gas, it is to be understood that other kinds of gas can conveniently be employed, such as coal gas, oil gas, and the like.

In carrying out my process the natural or other gas is purified in any appropriate manner, and if desired, the gasoline can be recovered therefrom during this operation. The gas is then further cooled in a regenerative cycle and expanded, finally resulting in the continuous liquefaction of a substantial portion of the original gas. It is to be understood that the pressure and temperature conditions are so maintained that nitrogen and like inert ingredients of the natural gas will not be liquefied. The annexed drawing shows a device in which the liquefied gas can conveniently be treated and subseqeuntly dispensed. In said drawing, 1 represents a high-pressure cylinder, such as is commonly used for storing and shipping liquid air or gases under very high pressures; 2 represents a tube reaching from the top nearly to the bottom of the cylinder, and at its upper part screwed into the plug 3, containing a passage 4, leading to an outlet 5. At some convenient point in the passageway 4 is located the point of a needle valve 6 which is provided with a suitable operating handle 7 for opening and closing the same. The receptacle 1 may be of any suitable size, but for convenience in operation I find that a cylinder having a capacity of about 35 pounds of the liquefied gas (when filled to the extent indicated in the drawing) is a convenient size to employ. Into this receptacle is first placed a small amount of finely-divided fuel of high carbon content, lampblack being mentioned as a preferred example of such solid fuel. With this may be placed two ounces more or less of heavy petroleum oil, or other heavy hydrocarbon material, this latter being advisable but not absolutely necessary. There is then run into the cylinder under pressure, liquefied gas of the character above stated, until the desired quantity thereof, say 35 pounds, has been introduced. The pressure of the gas in the free space 8, in the top of the receptacle, may vary from 500 to 1500 pounds per square inch. The liquid and other materials in the container 1 are, before the same is to be employed, shaken or agitated (as by inverting the receptacle a few times) to produce a thorough mixture of the ingredients. The fuel can be stored in this condition for any desired length of time, until the same is wanted for use.

For using the fuel, the outlet 5 is connected with a suitable burner (not shown) and by manipulating the handle 7, the point of the needle valve 6 is raised somewhat, whereupon the liquid will flow past the point of this needle valve and will vaporize in the tube leading to the burner. The very finely-divided carbon and the petroleum, or other heavy oil thereby produced in the gas will be carried along in the gas to the burner tip and consumed. In order to illustrate the advantages of the lampblack and heavy mineral oil, I will state that a particular sample of the liquefied hydrocarbons of natural gas was itself insufficient in heating intensity to weld an iron rod or bar upon which test was made. With one-half ounce of the carbon black added to 35 pounds of the liquefied gas it was possible to heat a steel bar to a welding temperature in 33 seconds and with the addition of the heavy oil as above stated, the time was reduced to about 10 seconds. A fair weld was made when the carbon black only was added to the liquefied hydrocarbons, and an excellent weld was made when carbon black and heavy oil were both added.

I have referred in the above to the use of carbonblack or lampblack, and this is the preferred form of the solid carbonaceous material. Other forms of carbon can be employed, however, such as hard or soft coal, graphite, other forms of amorphous carbon, such as charcoal, bone-black, and to some extent compounds of carbon of high melting points.

It is to be understood that in the liquefaction of the natural gas, a pressure of 500 to 1500 pounds and a temperature of about —80° C. is preferably employed.

I do not limit myself to the use of petroleum oil as the heavy hydrocarbon, for use in this invention. Coal tar, creosote oil or any other substance high in carbon, which is soluble in the liquefied gas may be used.

I claim:

1. A fuel composition comprising a liquefied normally gaseous hydro-carbon, and carbon-powder suspended therein.

2. A fuel composition, comprising approximately thirty-five pounds of liquefied compressed hydro-carbon which is adapted to vaporize upon its release from compression, and a small fraction of a pound of carbon-powder suspended therein.

3. A fuel comprising liquefied combustible gas, and powdered carbon in suspension therein.

4. A fuel comprising liquefied combustible hydro-carbon gas, powdered carbon in suspension therein, and a heavy hydro-carbon oil.

5. A fuel composition comprising liquefied combustible hydrocarbon gas and heavy combustible oil mixed therewith.

6. In the production of a composition which can be used as fuel, the improvement which comprises liquefying at least a substantial fraction of a combustible gas, thereby producing a volatile liquid, and suspending approximately one-half ounce of carbon powder in each thirty-five pounds of the said volatile liquid.

In testimony whereof I have hereunto set my hand.

CHARLES F. CROMMETT.